United States Patent
Jeong

(10) Patent No.: US 12,355,028 B2
(45) Date of Patent: Jul. 8, 2025

(54) SECONDARY BATTERY AND DEVICE INCLUDING THE SAME

(71) Applicant: LG ENERGY SOLUTION, LTD., Seoul (KR)

(72) Inventor: Ansoo Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 648 days.

(21) Appl. No.: 17/639,205

(22) PCT Filed: Sep. 1, 2020

(86) PCT No.: PCT/KR2020/011676
§ 371 (c)(1),
(2) Date: Feb. 28, 2022

(87) PCT Pub. No.: WO2021/075710
PCT Pub. Date: Apr. 22, 2021

(65) Prior Publication Data
US 2022/0328859 A1 Oct. 13, 2022

(30) Foreign Application Priority Data
Oct. 18, 2019 (KR) .......... 10-2019-0129946

(51) Int. Cl.
*H01M 10/04* (2006.01)
*H01M 10/0587* (2010.01)
*H01M 50/538* (2021.01)

(52) U.S. Cl.
CPC ... *H01M 10/0431* (2013.01); *H01M 10/0587* (2013.01); *H01M 50/538* (2021.01); *H01M 2220/20* (2013.01)

(58) Field of Classification Search
CPC .......... H01M 10/0431; H01M 50/538; H01M 10/0587; H01M 2220/20
(Continued)

(56) References Cited

U.S. PATENT DOCUMENTS 7,858,225 B2    12/2010  Chun
2007/0154797 A1  7/2007  Hyung et al.
(Continued)

FOREIGN PATENT DOCUMENTS

CN    106558680 A   4/2017
JP       2697313 B2   1/1998
(Continued)

OTHER PUBLICATIONS

Extended European Search Report for European Application No. 20877946.2, dated Dec. 8, 2022.
(Continued)

*Primary Examiner* — Jonathan G Jelsma
*Assistant Examiner* — Omar M Kekia
(74) *Attorney, Agent, or Firm* — Birch, Stewart, Kolasch & Birch, LLP

(57) ABSTRACT

A secondary battery including a jelly-roll type electrode assembly in which a first electrode sheet, a second electrode sheet are wound with a separator interposed between the first electrode sheet and the second electrode sheet and a first electrode tab which is joined to an uncoated portion of the first electrode sheet and is positioned at a central portion of the jelly-roll type electrode is provided. The first electrode tab includes a joining portion joined to the uncoated portion and an extension portion extended outward from the joining apportion. A width of the joining portion is wider than a width of the extension portion. The joining portion is wound ¾ times or more and once or less in the central portion of the jelly-roll electrode assembly.

11 Claims, 9 Drawing Sheets

(58) Field of Classification Search
USPC .......................................................... 429/211
See application file for complete search history.

(56) References Cited

U.S. PATENT DOCUMENTS

| | | | | |
|---|---|---|---|---|
| 2007/0154801 | A1* | 7/2007 | Hyung | H01M 10/0587 |
| | | | | 29/623.5 |
| 2012/0321942 | A1 | 12/2012 | Ahn | |
| 2014/0120397 | A1 | 5/2014 | Kim et al. | |
| 2017/0092926 | A1 | 3/2017 | Doo et al. | |
| 2019/0198882 | A1* | 6/2019 | Jeong | H01M 50/147 |
| 2020/0295341 | A1 | 9/2020 | Kim et al. | |

FOREIGN PATENT DOCUMENTS

| | | |
|---|---|---|
| JP | 2003-151527 A | 5/2003 |
| JP | 2006-4792 A | 1/2006 |
| JP | 2006-310283 A | 11/2006 |
| JP | 2012-169161 A | 9/2012 |
| JP | 5311861 B2 | 10/2013 |
| JP | 2016-162730 A | 9/2016 |
| JP | 2002-246289 A | 3/2025 |
| KR | 2000-0051740 A | 8/2000 |
| KR | 10-0731453 B1 | 6/2007 |
| KR | 10-2012-0139010 A | 12/2012 |
| KR | 10-2015-0029544 A | 3/2015 |
| KR | 10-1575984 B1 | 12/2015 |
| KR | 10-2016-0100537 A | 8/2016 |
| KR | 10-2016-0117941 A | 10/2016 |
| KR | 10-2018-0000223 A | 1/2018 |
| KR | 10-2019-0033904 A | 4/2019 |
| WO | WO 2018/190691 A1 | 10/2018 |

OTHER PUBLICATIONS

International Search Report for PCT/KR2020/011676 mailed on Dec. 2, 2020.

* cited by examiner

[FIG. 1] CONVENTIONAL ART
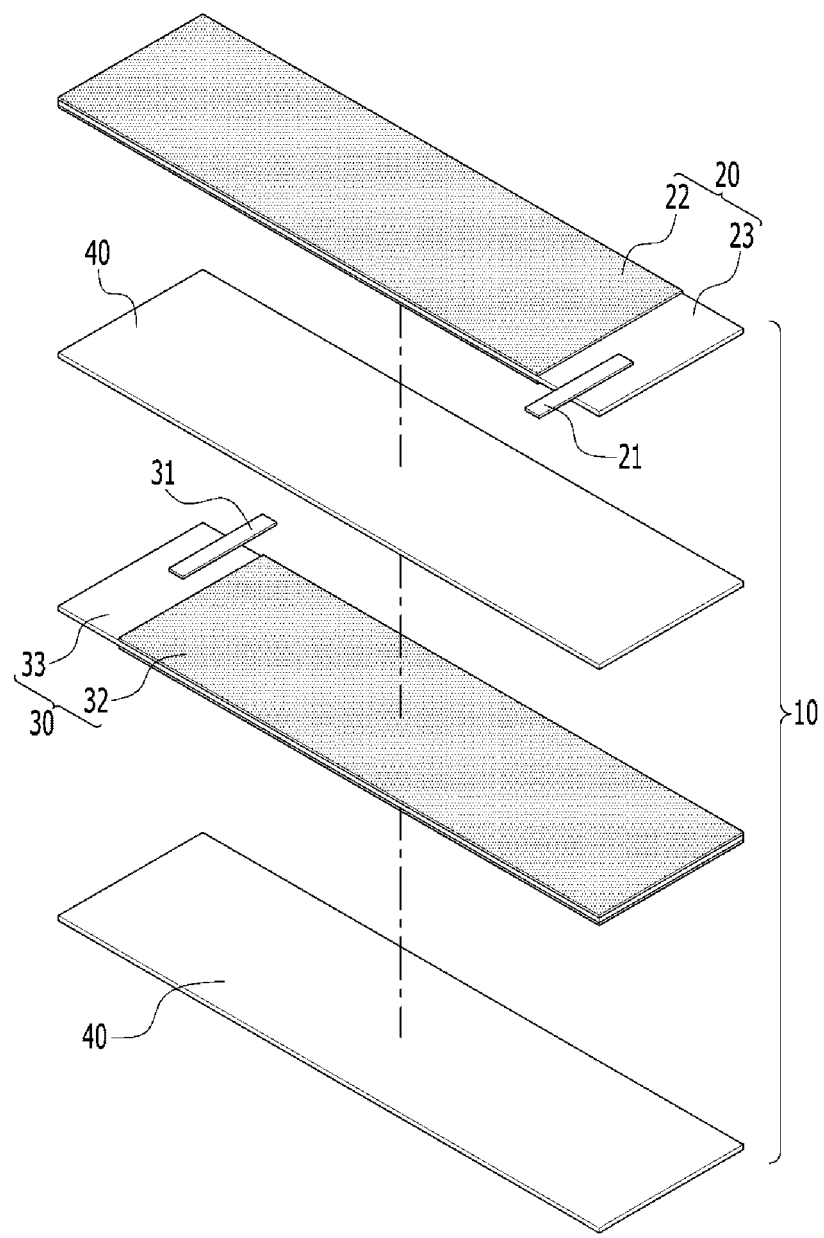

[FIG. 2]  CONVENTIONAL ART
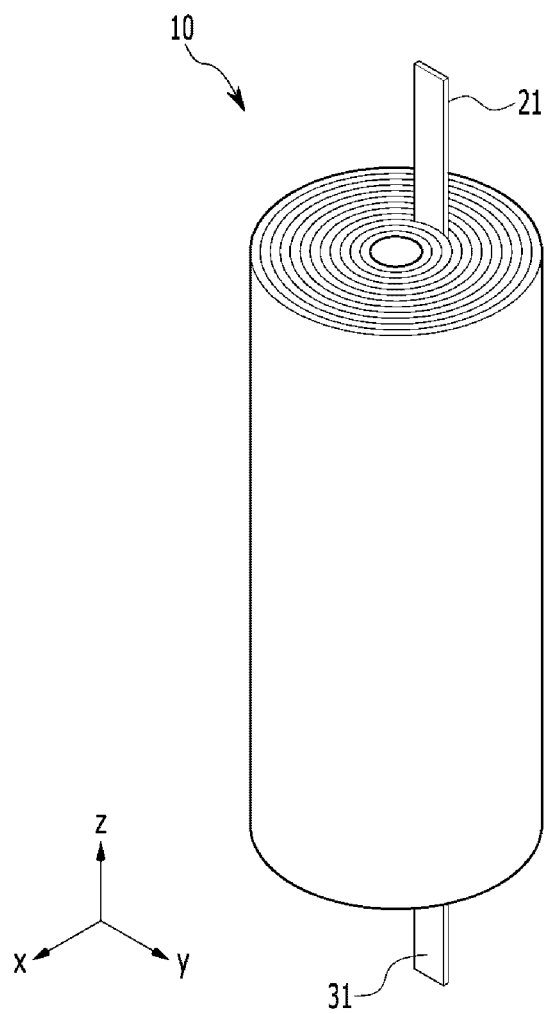

[FIG. 3]
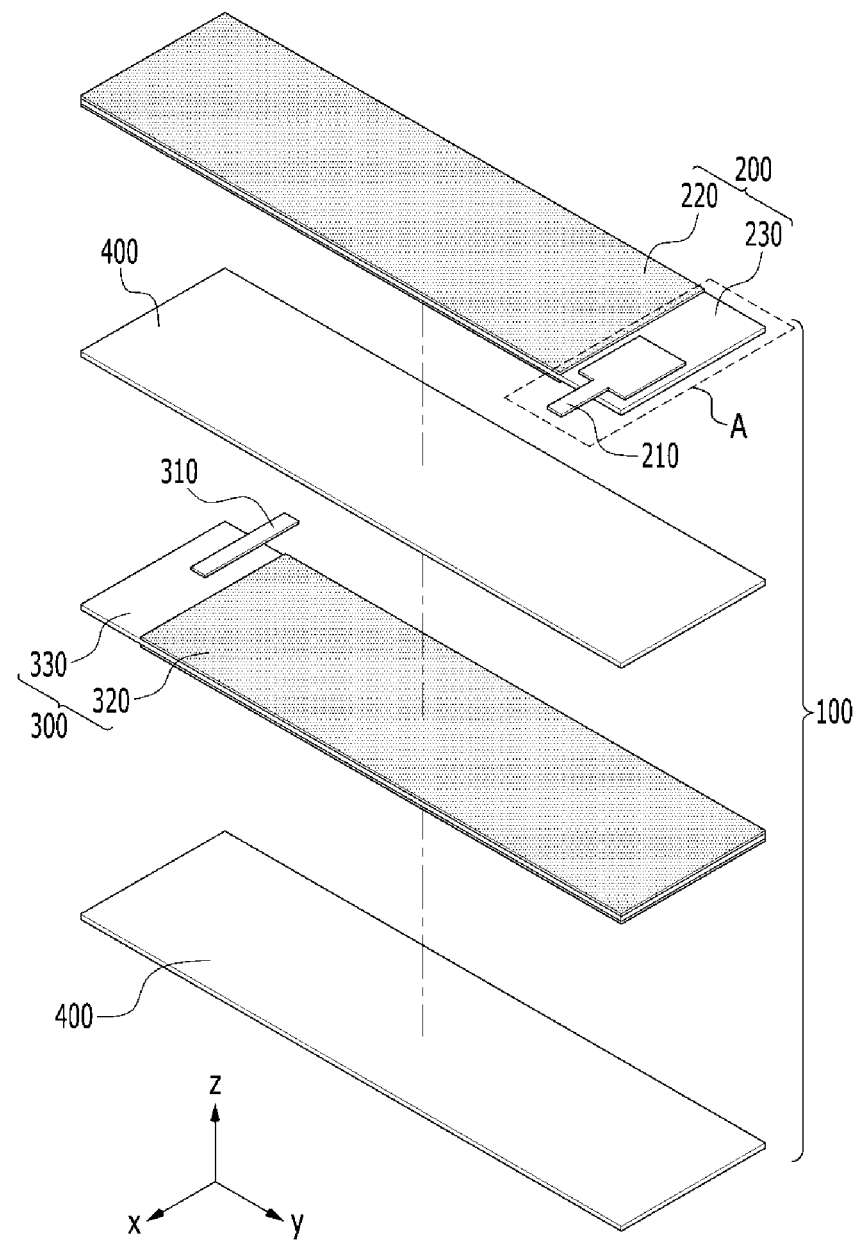

[FIG. 4]
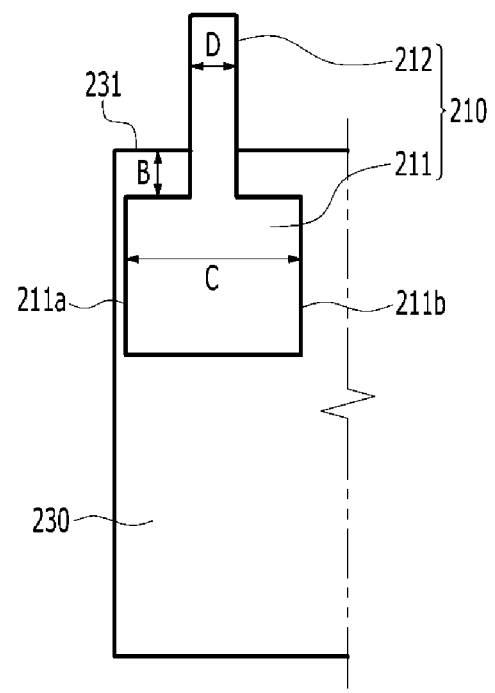

[FIG. 5]
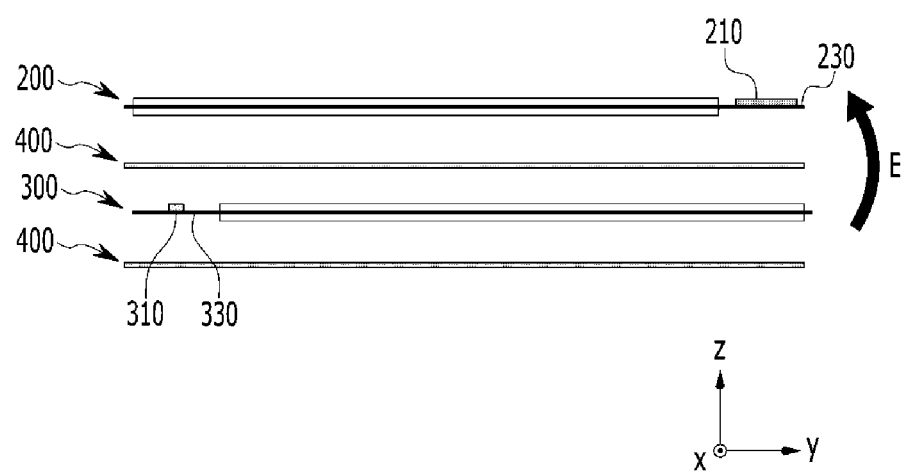

[FIG. 6]
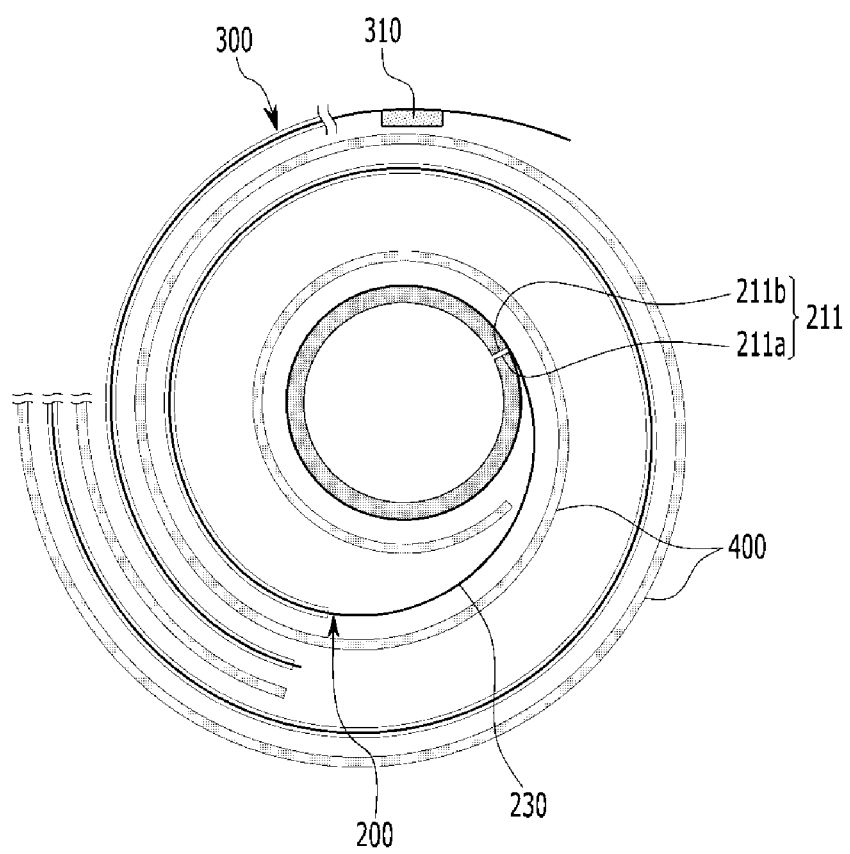

[FIG. 7]
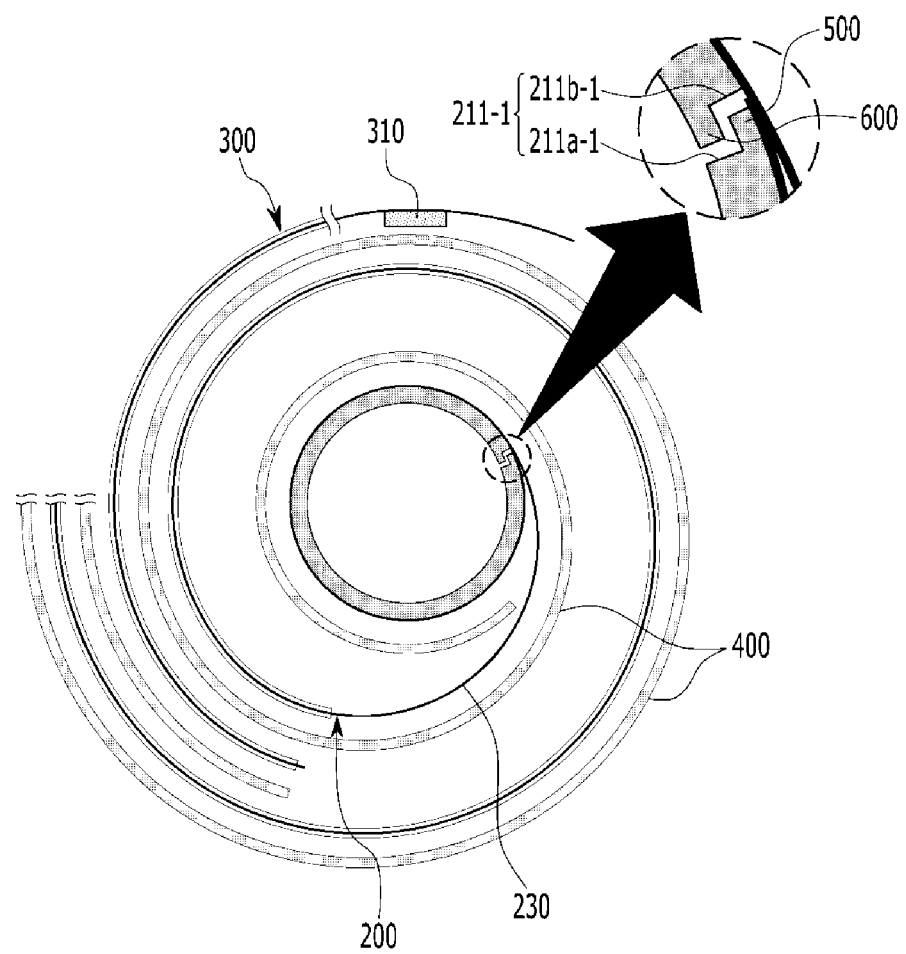

[FIG. 8]
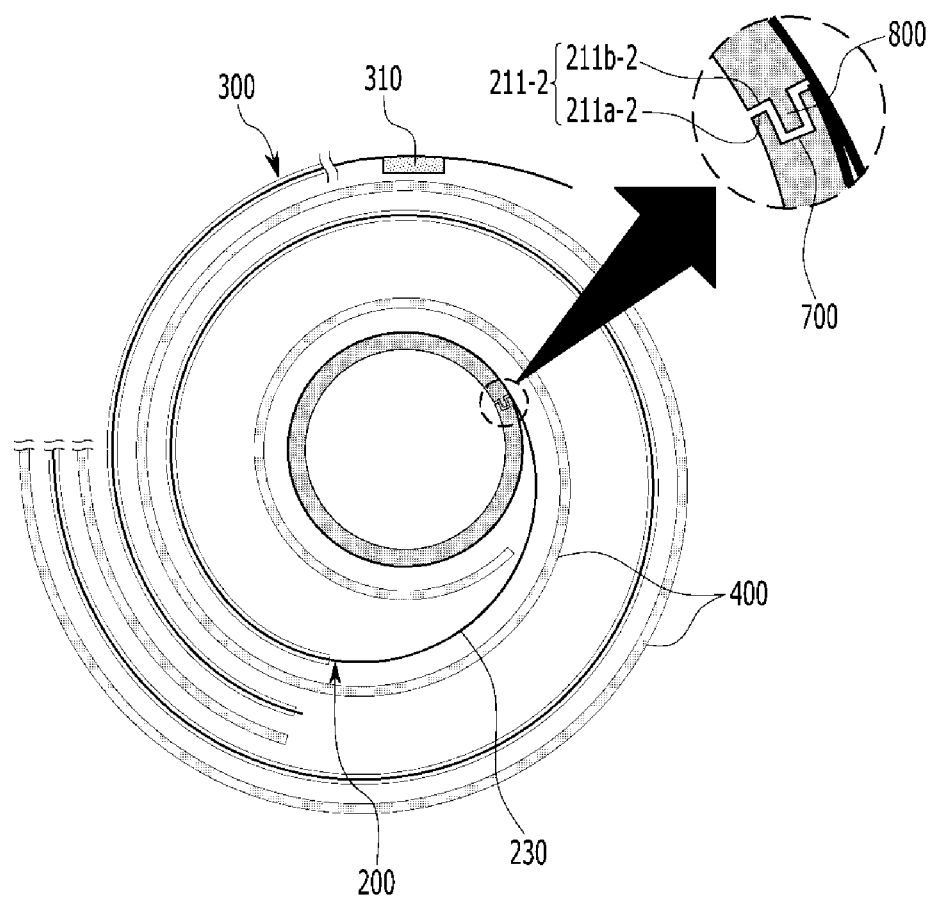

[FIG. 9]
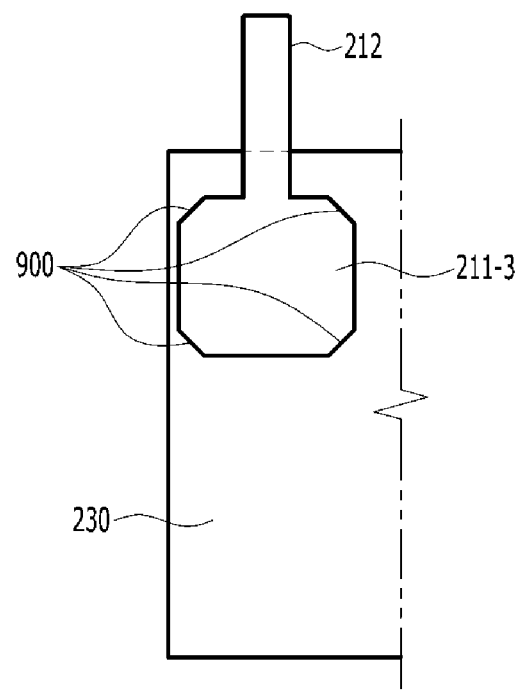

SECONDARY BATTERY AND DEVICE INCLUDING THE SAME

CROSS CITATION WITH RELATED APPLICATION(S)

This application claims the benefit of Korean Patent Application No. 10-2019-0129946 filed on Oct. 18, 2019 with the Korean Intellectual Property Office, the disclosure of which is incorporated herein by reference in its entirety.

TECHNICAL FIELD

The present disclosure relates to a secondary battery and a device including the same, and more particularly to a secondary battery including a jelly-roll type electrode assembly and a device including the same.

BACKGROUND ART

Recently, as energy source price is increasing due to the depletion of fossil fuels and increasing interest is being paid to environmental pollution, the demand for environmentally-friendly alternative energy sources is bound to play an important role in the future life. Thus, research into techniques for generating various kinds of power, such as nuclear energy, solar energy, wind energy, and tidal power, is underway, and power storage apparatuses for more efficient use of the generated energy are also drawing much attention.

In particular, as technology development and demands for mobile devices increase, the demand for batteries as energy sources is rapidly increasing. Accordingly, many researches on batteries capable of meeting diverse demands have been conducted.

Typically, a lithium secondary battery, such as a lithium ion battery or a lithium ion polymer battery, which have advantages such as a high energy density, a discharge voltage, an output stability, and the like is highly demanded.

Further, the secondary battery may be classified based on the shape of a battery case into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of a laminated aluminum sheet.

Further, the secondary battery may also be classified based on how the electrode assembly, having a structure in which a positive electrode, a negative electrode, and a separator interposed between the positive electrode and the negative electrode are stacked, is structured.

Typically, the electrode assemblies may include a jelly-roll (wound) type electrode assembly in which a long sheet type positive electrode and a long sheet type negative electrode are wound with a separator interposed therebetween, and a stacked (laminated) type electrode assembly in which a plurality of positive electrodes and negative electrodes, cut into predetermined unit sizes, are sequentially stacked with separators being interposed therebetween, and the like.

Recently, in order to solve the problems involved in the jelly-roll type electrode assembly and the stacked type electrode assembly, a stacked/folded type electrode assembly having an improved structure, which is a combination of the jelly-roll type electrode assembly and the stacked type electrode assembly, has been developed. The stacked/folded type electrode assembly has a structure in which unit cells, which are stacked with certain units of the positive electrodes and the negative electrodes while a separator being interposed therebetween, are sequentially wound in a state of being positioned on a separator film.

FIG. 1 is an exploded perspective view showing a state before a conventional jelly roll electrode assembly 10 is wound.

Referring to FIG. 1, the conventional jelly-roll type electrode assembly 10 inserted into the secondary battery includes a first electrode sheet 20, a second electrode sheet 30, and a separator 40 interposed between the first electrode sheet 20 and the second electrode sheet 30. In addition, in order to prevent the first electrode sheet 20 and the second electrode sheet 30 from coming into contact with each other when wound in the form of a jelly roll, it is preferable that the separator 40 is additionally disposed under the second electrode sheet 30.

Here, the first electrode sheet 20 and the second electrode sheet 30 may correspond to a positive electrode sheet and a negative electrode sheet, respectively.

An active material layer 22 is formed on the first electrode sheet 20, and a first electrode tab 21 may be joined to an uncoated portion 23, on which an active material layer 22 is not formed, by a method such as welding.

Similarly, an active material layer 32 is formed on the second electrode sheet 30, and a second electrode tab 31 may be joined to an uncoated portion 33, on which an active material layer 32 is not formed, by a method such as welding.

FIG. 2 is a perspective view showing a state in which the electrode assembly 10 of FIG. 1 is wound.

Referring to FIG. 2, a first electrode tab 21 and a second electrode tab 31 are extended in an upper direction (Z-axis direction) and a lower direction (a direction opposite to the Z-axis) of the wound electrode assembly 10.

At this time, when the wound electrode assembly 10 is viewed from above, the first electrode tab 21 and the second electrode tab 31 have no choice but to be located on either side with respect to the central axis of the electrode assembly 10. In particular, FIG. 2 shows that the first electrode tab 21 is located so as to be biased in a direction opposite to the X axis with respect to the central axis of the electrode assembly 10.

Thus, due to the electrode tabs 21 and 31, the electrode assembly 10 also has no choice but to have an increased outer diameter and show an asymmetric shape, when viewed from above.

When performing an impact test on the secondary battery in which the electrode assembly 10 is housed, there is a problem that the results are derived differently depending on the positions of the electrode tabs 21 and 31, and the electrode assembly 10 is pushed in a direction in which the electrode tabs 21 and 31 are not positioned. This is a problem that the secondary battery may exhibit not only in an impact test but also even when exposed to an external impact. Further, when the electrode assembly 10 is charged and discharged, a phenomenon in which the electrode assembly 10 swells may occur. Due to such an asymmetric shape, there may be a problem that the shape is distorted with respect to the portion where the electrode tabs 21 and 31 are not positioned.

The thickness of the first electrode tab 21 and the second electrode tab 31 may be said to be thin, but since winding of the first electrode sheet 20, the second electrode sheet 30, and the separator 40 is usually performed several tens of times or more, the asymmetry and distortion phenomena of the electrode assembly 10 are even more prominent, which may ultimately cause a problem which cannot be ignored.

Therefore, in reality, there is a great need to develop a technology capable of solving the above-mentioned problems.

DETAILED DESCRIPTION OF THE INVENTION

Technical Problem

Embodiments of the present disclosure have been designed to solve the above-mentioned problems of the previously proposed methods, and an object of the present disclosure is to prevent the occurrence of asymmetry or distortion of the shape due to electrode tabs even when the electrode assembly is wound.

However, the problem to be solved by embodiments of the present disclosure is not limited to the above-described problems, and can be variously expanded within the scope of the technical idea included in the present disclosure.

Technical Solution

A secondary battery according to the embodiments of the present disclosure includes: a jelly-roll type electrode assembly in which a first electrode sheet, a second electrode sheet are wound with a separator interposed between the first electrode sheet and the second electrode sheet, the first electrode sheet having an active material layer and an uncoated portion; and a first electrode tab joined to the uncoated portion of the first electrode sheet and positioned at a central portion of the jelly-roll type electrode assembly, wherein the first electrode tab includes a joining portion joined to the uncoated portion and an extension portion extended outward from the joining portion, wherein a width of the joining portion is wider than a width of the extension portion, and wherein the joining portion is wound ¾ times or more and once or less in the central portion of the jelly-roll electrode assembly.

The uncoated portion of the first electrode sheet may be formed at one end part of the first electrode sheet.

The first electrode sheet may be wound about a direction in which the first electrode tab extends.

The joining portion may be wound once.

The joining portion includes a first end and a second end opposite the first end, and the first end of the joining portion may be in contact with the second end of the joining portion.

A stepped portion may be formed at the first end of the joining portion, and a protruding portion engaging with the stepped portion may be formed at the second end of the joining portion.

A recessed groove may be formed at the first end of the joining portion, and a regressed groove insertion portion, which is inserted into the recessed groove, may be formed at the second end of the joining portion.

The joining portion has a first surface in contact with the uncoated portion and a second surface opposite the first surface, and the recessed groove and the regressed groove insertion portion may located between the first surface and the second surface.

The joining portion may include a trimming portion formed in at least one corner of the joining portion.

The extension portion may be extended across an upper side of the uncoated portion, and the joining portion may be separated from the upper side of the uncoated portion.

The jelly-roll type electrode assembly may be wound in a cylindrical shape.

Advantageous Effects

According to the embodiments of the present disclosure, when the electrode assembly is wound through the joining portion of the electrode tabs that are wound ¾ times or more times and once or less, it is possible to prevent the occurrence of asymmetry or distortion phenomena of the shape of the electrode assembly.

In addition, since the electrode tabs are joined to the uncoated portion in a wide area, heat generated from the electrode tabs can be easily discharged to the outside.

BRIEF DESCRIPTION OF THE DRAWINGS

FIG. 1 is an exploded perspective view showing a state before a conventional jelly roll type electrode assembly is wound.

FIG. 2 is a perspective view showing a state in which the electrode assembly of FIG. 1 is wound.

FIG. 3 is an exploded perspective view showing a state before the electrode assembly according to one embodiment of the present disclosure is wound.

FIG. 4 is an enlarged partial view of the portion "A" of FIG. 3.

FIG. 5 is a diagram of the electrode assembly of FIG. 3 viewed from a direction opposite to the X-axis.

FIG. 6 is a diagram showing a state in which the electrode assembly of FIG. 5 is wound in the E direction.

FIG. 7 is a diagram showing an electrode assembly having a stepped portion and a protruding portion.

FIG. 8 is a diagram showing an electrode assembly having a recessed groove and a recessed groove insertion portion.

FIG. 9 is a partial view of an electrode assembly having a trimming portion.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the drawings. In the figures, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 3 is an exploded perspective view showing a state before the jelly-roll type electrode assembly 100 according to one embodiment of the present disclosure is wound.

Referring to FIG. 3. the secondary battery according to one embodiment of the present disclosure includes a jelly-roll type electrode assembly 100 in which a first electrode sheet 200 and a second electrode sheet 300 are wound with a separator 400 interposed between the first electrode sheet 200 and the second electrode sheet 300.

An active material layer 220 is formed on the first electrode sheet 200, and a first electrode tab 210 may be joined to an uncoated portion 230 on which the active material layer 220 is not formed, by a method such as welding.

Similarly, an active material layer 320 is formed on the second electrode sheet 300, and a second electrode tab 310 may be joined to an uncoated portion 330, on which an active material layer 320 is not formed, by a method such as welding.

The first electrode sheet 200 and the second electrode sheet 300 may correspond to any one of a positive electrode sheet and a negative electrode sheet, respectively, and accordingly, the first electrode tab 210 and the second electrode tab 310 may correspond to any one of a positive electrode tab and a negative electrode tab, respectively.

The following contents will be described based on the first electrode tab 210. At this time, the second electrode tab 310 may have a configuration of a conventional electrode tab unlike the first electrode tab 210 as shown in FIG. 3. Alternatively, the second electrode tab in the present embodiment may have the configuration identical to or similar to the first electrode tab 210.

FIG. 4 is an enlarged partial view of the portion "A" of FIG. 3.

Referring to FIG. 4, the first electrode tab 210 includes a joining portion 211 joined to the uncoated portion 230 and an extension portion 212 extended from the joining portion 211 to the outside.

The width C of the joining portion 211 is wider than the width D of the extension portion 212. In FIG. 4, the extension portion 212 is extended from the center of the upper side of the joining portion 211. However, if the width C of the joining portion 211 is wider than the width D of the extension portion 212, the position of the extension portion 212 is not limited and thus, the extension portion 212 may be extended from any one end of the upper side of the joining portion 211.

In this embodiment, forming the width C of the joining portion 211 to be wide is for the purpose of allowing the joining portion 211 to be wound ¾ times or more and once or less in the center of the electrode assembly, when the first electrode sheet 200 including the joining portion 211 is wound. Hereinafter, a detailed description will be given.

FIG. 5 is a diagram of the jolly-roll type electrode assembly 100 of FIG. 3 viewed from a direction opposite to the X-axis.

Referring to FIG. 5, when winding the first electrode sheet 200, the second electrode sheet 300 and the separator 400, these may be wound in the direction in which the first electrode tab 210 is located (Z-axis direction), that is, in the E direction, with respect to the first electrode sheet 200.

FIG. 6 is a diagram showing a state in which the jelly-roll type electrode assembly of FIG. 5 is wound in the E direction.

Referring to FIG. 6, the joining portion 211 is wound ¾ times or more and once or less in the center of the jelly-roll type electrode assembly 100, and more preferably, may be wound once.

As described above, in this embodiment, the width C of the joining portion 211 is widely formed as shown in FIG. 4, and the joining portion 211 is wound ¾ times or more and once or less, so that it can maintain a symmetrical shape, unlike the conventional jelly-roll type electrode assembly. That is, the jelly-roll type electrode assembly 100 may be wound in a planar shape, that is, in a circular shape when viewed from above.

Therefore, even if the secondary battery that has housed the jelly-roll type electrode assembly 100 is subjected to an impact test, consistent results can be derived regardless of the position of the electrode tabs 210 and 310, and the problem that the jelly-roll type electrode assembly 100 is pushed in the process of impact can be solved.

Further, even when the jelly-roll type electrode assembly 100 is charged and discharged, a problem that the shape thereof is distorted can be minimized.

When the joining portion 211 is wound less than ¾ times, it is not possible to effectively prevent the occurrence of asymmetry or distortion phenomenon of the wound jelly-roll type electrode assembly 100. On the other hand, when the joining portion 211 is wound more than once, since a portion where the joining portion 211 overlaps occurs, rather, it may cause an asymmetric shape of the jelly-roll type electrode assembly 100, which is not preferable.

Further, in the case of the electrode tab, heat is severely generated, and the joining portion 211, which is joined to a large area, is easier to discharge heat generated from the first electrode tab 210 to the outside. That is, the heat dissipation performance of the first electrode tab 210 may be improved through the joining portion 211 joined to a large area.

On the other hand, the uncoated portion 230 of the first electrode sheet 200 may be formed at one end of the first electrode sheet 200 as shown in FIGS. 3 to 5, so that the first electrode tab 210 including the joining portion 211 can be positioned at a central portion of the jelly-roll type electrode assembly 100. Therefore, referring to FIGS. 4 and 6 together, one end 211a of the joining portion 211 and the other end 211b opposite thereto may be in contact with each other. Further, as described above, the first electrode sheet 200 can be wound in the E-direction of FIG. 5 so that one end 211a and the other end 211b are in contact with each other.

FIG. 7 is a diagram showing an electrode assembly provided with a stepped portion 500 and a protruding portion 600 as a modified embodiment of the present disclosure, and shows a state in which the electrode assembly is viewed in the same direction as in FIG. 6.

Referring to FIG. 7, a stepped portion 500 may be formed at one end 211a-1 of the joining portion 211-1, and a protruding portion 600 that engages with the stepped portion 500 may be formed at the other end 211b-1 of the joining portion 211-1.

The stepped portion 500 and the protruding portion 600 have a configuration for more easily implementing the one-time winding of the joining portion 211-1, which can effectively achieve one-time winding of the joining portion 211-1 while the protruding portion 600 is fitted into a step on which the stepped portion 500 is formed. That is, the joining portion 211-1 is wound more than once through the stepped portion 500 and the protruding portion 600, thereby preventing the occurrence of the overlapping portion.

Further, the position of the protruding portion 600 engaged with the stepped portion 500 is not limited, and thus, unlike FIG. 7, a protruding portion is formed at one end 211a-1, and a stepped portion may also be formed at the other end 211b-1.

FIG. 8 is a diagram showing an electrode assembly having a recessed groove 700 and a recessed grove insertion portion 800 as a modified embodiment of the present disclosure, which shows a state in which the electrode assembly is viewed in the same direction as in FIG. 6.

Referring to FIG. 8, a recessed groove 700 may be formed at one end 211a-2 of the joining portion 211-2, and a recessed groove insertion portion 800, which can be inserted into the recessed groove 700, may be formed at the other end 211b-2 of the joining portion 211-2.

The recessed groove 700 and the recessed groove insertion portion 800 have a configuration for more easily implementing one-time winding of the joining portion 211-2, and the recessed groove insertion portion 800 is inserted into the recessed groove 700, so that it is possible to effectively achieve one-time winding of the joining portion 211-2. That is, the joining portion 211-2 is wound more than once through the recessed groove 700 and the recessed groove insertion portion 800, thereby preventing the overlapping portion from occurring.

More specifically, the recessed groove 700 and the recessed groove insertion portion 800 may be positioned at a central portion of one end 211a-2 and the other end 211b-2, respectively. In other words, both the recessed groove 700 and the recessed groove insertion portion 800 may be positioned apart from a surface to which the joining portion 211-2 is joined to the uncoated portion and a surface opposite to the joining portion 211-2.

By inserting the recessed groove insertion portion 800 into the recessed groove 700, more strong fastening between the one end 211a-2 and the other end 211b-2 is possible.

In addition, the positions of the recessed groove 700 and the recessed groove insertion portion 800 are not limited, and thus, unlike FIG. 8, a recessed groove insertion portion may be formed at one end 211a-2 and a recessed groove may be formed at the other end 211b-2.

Meanwhile, referring to FIG. 4, the extension portion 212 of the first electrode tab 210 is extended in the direction of the upper side 231 of the uncoated portion 230, and the joining portion 211 may be separated apart from the upper side 231 of the uncoated portion 230. The distance B to be separated is not particularly limited, but it is preferably 2.0 mm or more and 3.0 mm or less.

If the joining portion 211 is not separated apart from the upper side 231 of the uncoated part 230 or the distance B is less than 2.0 mm, in the first electrode sheet to be wound, the first electrode tab 210 may rise above the jelly-roll type electrode assembly, and accordingly, the joining portion 211 having a wide width C is exposed to the outside of the jelly-roll type electrode assembly, so that the possibility of causing a problem such as a short may rapidly increase.

FIG. 9 is a partial view of an electrode assembly having a trimming portion 900.

Referring to FIG. 9, the joining portion 211-3 may include a trimming portion 900 which is formed on at least one of the corners of the joining portion 211-3 joined to the uncoated portion 230.

By forming the trimming portion 900 as in the present embodiment, it is possible to prevent the problem that the electrode sheet, the separator, or the like, is torn due to the corners of the joining portion 211-3 during winding.

Meanwhile, the secondary battery according to embodiments of the present disclosure may include a battery case for housing the jelly-roll type electrode assembly. The battery case may be a cylindrical case, a prismatic case, or a pouch-type case, but is preferably a cylindrical case.

The above-mentioned one or more secondary batteries can be applied to various devices. These devices may be applied to transportation means such as an electric bicycle, an electric vehicle, a hybrid vehicle, without being limited thereto, and can be applied to various devices that can use the secondary battery.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

200: first electrode sheet
210: first electrode tab
211: joining portion
212: extension portion
300: second electrode sheet
400: separator
500: stepped portion
600: protruding portion
700: recessed groove
800: recessed groove insertion portion
900: trimming portion

The invention claimed is:

1. A secondary battery comprising:
a jelly-roll type electrode assembly in which a first electrode sheet, a second electrode sheet are wound with a separator interposed between the first electrode sheet and the second electrode sheet, the first electrode sheet having an active material layer and an uncoated portion; and
a first electrode tab joined to the uncoated portion of the first electrode sheet and positioned at a central portion of the jelly-roll type electrode assembly,
wherein the first electrode tab includes a joining portion joined to the uncoated portion and an extension portion extended outward from the joining portion,
wherein a width of the joining portion is wider than a width of the extension portion,
wherein the joining portion is wound ¾ times or more and once or less in the central portion of the jelly-roll electrode assembly,
wherein the extension portion extends across an upper side of the uncoated portion, and
wherein the joining portion is separated from the upper side of the uncoated portion.

2. The secondary battery according to claim 1,
wherein the uncoated portion of the first electrode sheet is formed at one end part of the first electrode sheet.

3. The secondary battery according to claim 1,
wherein the first electrode sheet is wound about a direction in which the first electrode tab extends.

4. The secondary battery according to claim 1,
wherein the joining portion is wound once.

5. The secondary battery according to claim 1,
wherein the joining portion includes a first end and a second end opposite the first end, and
wherein the first end of the joining portion is in contact with the second end of the joining portion.

6. The secondary battery according to claim 1,
wherein the joining portion includes a trimming portion formed in at least one corner of the joining portion.

7. The secondary battery according to claim 1,
wherein the jelly-roll type electrode assembly is wound in a cylindrical shape.

8. A device comprising the secondary battery according to claim 1.

9. A secondary battery comprising:
a jelly-roll type electrode assembly in which a first electrode sheet, a second electrode sheet are wound with a separator interposed between the first electrode sheet and the second electrode sheet, the first electrode sheet having an active material layer and an uncoated portion; and
a first electrode tab joined to the uncoated portion of the first electrode sheet and positioned at a central portion of the jelly-roll type electrode assembly,
wherein the first electrode tab includes a joining portion joined to the uncoated portion and an extension portion extended outward from the joining portion,
wherein a width of the joining portion is wider than a width of the extension portion,
wherein the joining portion is wound ¾ times or more and once or less in the central portion of the jelly-roll electrode assembly,
wherein the joining portion includes a first end and a second end opposite the first end,
wherein the first end of the joining portion is in contact with the second end of the joining portion,
wherein a stepped portion is formed at the first end of the joining portion, and
a protruding portion engaging with the stepped portion is formed at the second end of the joining portion.

10. A secondary battery comprising:
a jelly-roll type electrode assembly in which a first electrode sheet, a second electrode sheet are wound with a separator interposed between the first electrode sheet and the second electrode sheet, the first electrode sheet having an active material layer and an uncoated portion; and
a first electrode tab joined to the uncoated portion of the first electrode sheet and positioned at a central portion of the jelly-roll type electrode assembly,
wherein the first electrode tab includes a joining portion joined to the uncoated portion and an extension portion extended outward from the joining portion,
wherein a width of the joining portion is wider than a width of the extension portion,
wherein the joining portion is wound ¾ times or more and once or less in the central portion of the jelly-roll electrode assembly,
wherein the joining portion includes a first end and a second end opposite the first end,
wherein the first end of the joining portion is in contact with the second end of the joining portion,
wherein a recessed groove is formed at the first end of the joining portion, and
a regressed groove insertion portion, which is inserted into the recessed groove, is formed at the second end of the joining portion.

11. The secondary battery according to claim 10,
wherein the joining portion has a first surface in contact with the uncoated portion and a second surface opposite the first surface, and
wherein the recessed groove and the regressed groove insertion portion are located between the first surface and the second surface.

* * * * *